A. H. PERRY.
STEERING ATTACHMENT.
APPLICATION FILED APR. 23, 1914.
1,103,538.
Patented July 14, 1914.
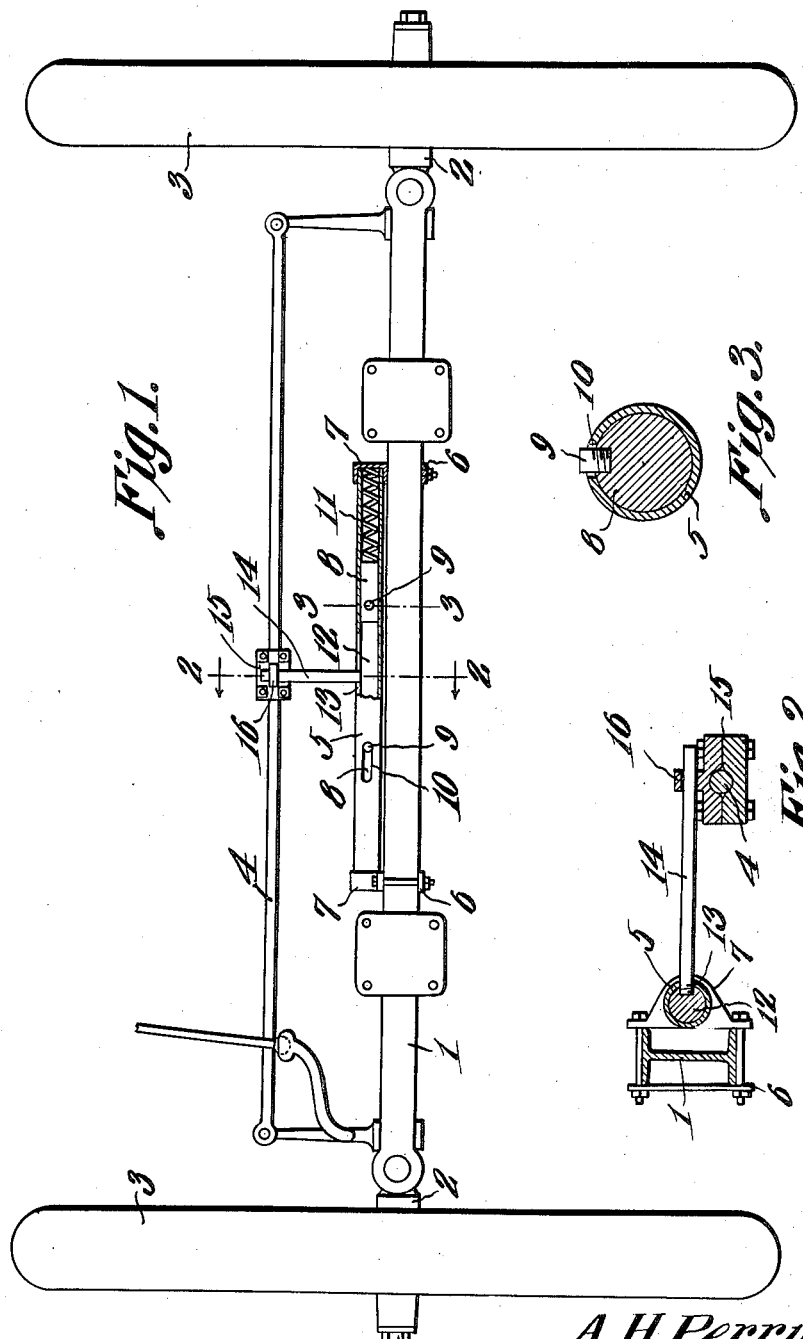
Witnesses
A. H. Perry,
Inventor
by
Attorneys

UNITED STATES PATENT OFFICE.

ALMERON H. PERRY, OF GENESEE, PENNSYLVANIA.

STEERING ATTACHMENT.

1,103,538.

Specification of Letters Patent. Patented July 14, 1914.

Application filed April 23, 1914. Serial No. 833,962.

*To all whom it may concern:*

Be it known that I, ALMERON H. PERRY, a citizen of the United States, residing at Genesee, in the county of Potter and State of Pennsylvania, have invented a new and useful Steering Attachment, of which the following is a specification.

The present invention appertains to steering gear attachments, and aims to provide a novel and improved device of that character.

The present invention contemplates the provision of a simple, non-encumbering and inexpensive attachment for a steering gear of a motor vehicle, or other self-propelled contrivance, and which will be of such construction and operation as to tend to stabilize or hold at neutral position, the steering gear.

Another object of the present invention is to provide a steering gear stabilizer which may be readily applied to various steering gears, and which will enable the steering gear to be more readily controlled by the operator, the present device being simple, practical, and efficient in its operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein—

Figure 1 is a plan view, portions being shown in section, of the improved attachment as applied to the steering gear of a motor vehicle. Figs. 2 and 3 are enlarged cross sectional views taken on the lines 2—2 and 3—3, respectively, of Fig. 1.

In the drawing, wherein the device has been illustrated as applied to the steering gear of a motor vehicle, although it is to be understood that the present device is applicable to steering gears of motor boats, or other self-propelled contrivances, the numeral 1 designates the front axle of the vehicle, which has pivoted to the ends thereof, the usual steering knuckles 2, to which the steering wheels 3 are journaled. The knuckles 2, as usual, are connected by a steering rod 4 parallel with the axle 1, for constraining the knuckles 2 to swing simultaneously.

The present attachment embodies a tubular casing 5, which is attached to the axle 1 by means of clamps 6. The clamps 6 preferably comprise two parts or sections connected by bolts, as clearly illustrated, and in the present instance, the parts or sections of the clamps 6 at one side of the axle 1 are provided with integral caps 7 threadedly or otherwise engaged over the ends of the casing 5, to thereby support the casing from the axle, and to close the ends of the casing at the same time.

Slidably disposed within the elongated casing 5, is a pair of spaced blocks 8, which are preferably circular in cross section so as to fit snugly within the casing 5, and which are constrained against rotary or oscillatory movements and limited in their reciprocatory or rectilinear movements, by means of stops or pins 9 threadedly engaging the blocks 8 and working within longitudinal slots 10 formed in the casing 5. The blocks 8 are spaced apart, and spaced from the ends of caps of the casing 5, coiled wire expansion springs 11 being disposed within the casing 5 between the blocks 8 and the caps 7, to normally force the blocks 8 toward each other, but enabling the blocks 8 to yield toward the respective ends of the casing.

A slide 12, preferably of circular cross section, is disposed snugly within the central portion of the casing 5 between the blocks 8, and is preferably of such a length that its ends normally abut against the adjacent ends of the blocks 8 to hold the slide 12 at neutral position. The casing 5 is provided at that side remote from the axle 1, with a longitudinal elongated slot 13 adjacent the slide 12, and through which an arm 14 extends so as to threadedly or otherwise engage the slide 12. The free end of the arm 14, which extends radially from the slide 12, is operatively connected to the steering rod 4 by means of a clamp 15, as clearly illustrated, having an upstanding apertured ear 16 loosely receiving the free end portion of the arm 14, in order that the reciprocatory or rectilinear motion of the steering rod 4 will be imparted to the slide 12 of the present attachment.

As will be obvious from the foregoing, the present attachment may be readily and inexpensively manufactured, and applied to the steering gear, so that the blocks 8 being thrust inwardly or toward each other, will tend to hold the slide 12 in neutral or central position, and consequently hold the steering wheels at neutral or normal positions. In this manner, the stability of the steering gear is enhanced, and the handling or controlling of the machine is rendered more easy, inasmuch as the steering wheels will be maintained at their normal "straight forward" positions without any effort on the part of the operator being necessary, although the steering wheels may be readily angled to one side or the other when necessary or desirable. Thus, when the steering rod 4 is moved to one side or the other, to steer the machine, the arm 14 being moved with the steering rod, will slide the slide or member 12 in the corresponding direction so as to force the block 8, toward which the slide 12 is moved, toward the respective end of the casing 5, to thereby compress the corresponding spring 11. In this manner, as the wheels are angled in one direction, one of the springs 11 will be brought under compression, thereby assisting in returning the steering wheels to normal position, when the steering rod 4 is released, as when the hand wheel (not shown) is returned to normal position, or released. Since the inward movement of the blocks 8 are limited by the stops 9 of the blocks working within the slots 10 of the casing 5, when the slide 12 is moved toward one end of the casing 5, the block 8 from which the slide 12 moves, will be held in place, to prevent it following the slide 12. When the slide 12 is at neutral or central position, it will be yieldably held in such position, by the blocks 8, which bear against the ends of the slide 12.

By adjusting the clamp 15 along the steering rod 4, the proper adjustment of the attachment may be made, to hold the steering rod normally at any desired position, according to the circumstances, it also being observed that the casing 5 may be adjusted longitudinally by loosening and sliding the clamps 6 along the axle 1.

From the foregoing, the salient features and capabilities of the present invention will be obvious to those versed in the art, without further comment being necessary.

Having thus described the invention, what is claimed as new is:

1. In a steering gear stabilizer, an elongated casing having a slot therein, a slide within the casing, an arm attached to the said slide and working within the said slot, and springs disposed within the casing at the opposite ends of the slide for holding the slide at neutral position.

2. In a steering gear stabilizer, an elongated casing having a slot therein, spring pressed blocks having limited sliding movements within the casing, a slide mounted within the casing between the blocks, and an arm carried by the slide and working through the said slot.

3. In a steering gear stabilizer, an elongated casing, having a longitudinal slot, caps engaged to the ends of the casing, spaced blocks having limited sliding movements within the casing, expansion springs disposed within the casing between the blocks and caps, a slide mounted within the casing between the said blocks, and an arm carried by the slide and working through the said slot.

4. The combination with an axle and a steering rod, of a casing attached to the axle, a spring held slide mounted within the casing and having an arm, and a clamp engaged to the steering rod and having an apertured portion receiving the free end of the said arm.

5. The combination with an axle and steering rod, of an elongated casing, clamps engaged to the axle and having caps engaging the ends of the casing, a slide mounted within the casing and having an arm working through the casing, springs disposed between the said caps and slide to hold the slide yieldably at neutral position, and a clamp engaged to the steering rod and having an apertured portion loosely receiving the free end of the said arm.

In testimony that I claim the foregoing as my own, I have hereto affixed my signature in the presence of two witnesses.

ALMERON H. PERRY.

Witnesses:
M. F. McCARN,
EARL S. ROBBINS.